Oct. 22, 1957 F. C. MOCK 2,810,374
MANIFOLD FUEL INJECTOR
Filed May 12, 1955 2 Sheets-Sheet 1

INVENTOR.
FRANK C. MOCK
BY James L. O'Brien
ATTORNEY

Oct. 22, 1957  F. C. MOCK  2,810,374
MANIFOLD FUEL INJECTOR
Filed May 12, 1955  2 Sheets-Sheet 2

INVENTOR.
FRANK C. MOCK
BY
James L. O'Brien
ATTORNEY

United States Patent Office 2,810,374
Patented Oct. 22, 1957

2,810,374

MANIFOLD FUEL INJECTOR

Frank C. Mock, South Bend, Ind., assignor to Bendix Aviation Corporation, South Bend, Ind., a corporation of Delaware Application May 12, 1955, Serial No. 507,958

8 Claims. (Cl. 123—119)

This invention relates generally to fuel injection devices for internal combustion engines and more particularly to the devices for injecting fuel into the intake manifolds of said engines.

The problems associated with the prior art manifold injection devices which have prevented or retarded the wide spread commercial use of such devices on modern motor vehicles are: (a) The use of accurately fitted plunger pumps to deliver slugs of fuel to the manifold adjacent the intake valve port in timed sequence to take place only on the intake stroke of the cylinder cycle. Pumps of this type are expensive to make and cause high intermittent line pressures; (b) the use of a separate fuel line and nozzle for each cylinder. This practice is expensive and leads to distribution difficulties caused by installation problems in keeping the lines of equal length and at the same temperatures; and (c) the use of spring controlled valves in each of the nozzles. A valve is necessary to prevent high manifold vacuum from vaporizing the fuel in the fuel lines. These valves are, however, expensive to make and almost impossible to adjust to provide uniform distribution to all of the cylinders.

I have discovered that a continuous fuel spray directed adjacent the intake valve port of each cylinder provides engine operation comparable to that obtained from timed injection. In the utilization of the continuous spray, fuel is injected into a substantially dead end air chamber during the compression, firing and exhaust strokes; but due to the gasp or rush of air as the intake valve opens on the intake stroke, the accumulated fuel is snatched into the cylinder and thoroughly mixed with the air charge in the ensuing turbulence.

The present invention has for an object the use of a single nozzle located in the induction passage formed with discharge ports to continuously discharge into each of the branches of a passage during the operation of the engine. Vaporization of fuel in the fuel line is prevented by using a single valve for all of the discharge ports. To avoid extremely small fuel discharge orifices at low deliveries an idle discharge port with an air bleed may be provided. To permit the use of a moderate range of pressures between the extremes of high and low delivery a multiplicity of valves can be used with a corresponding multiplicity of port series. The series of ports are arranged with the ports aligned in vertical planes so that dribbles of fuel occurring immediately upon the opening of the series may drop into the path of high velocity flow from the ports in the series just below. Each of the series of ports may be located in defined sections of the nozzles the cross-sectional area of which decreases in the direction of air flow so as to provide a shroud for the port series that discharges during part throttle operation. In some installations a shroud is desirable to permit the fuel spray to be properly directed into the entrances of the manifold branches before being subjected to turbulent air flow in the induction passage. In other installations however, a shroud may be omitted.

Other objects and advantages of the present invention will become readily apparent during the course of the following description, reference being had therein to the accompanying drawings, in which.

Figure 1:
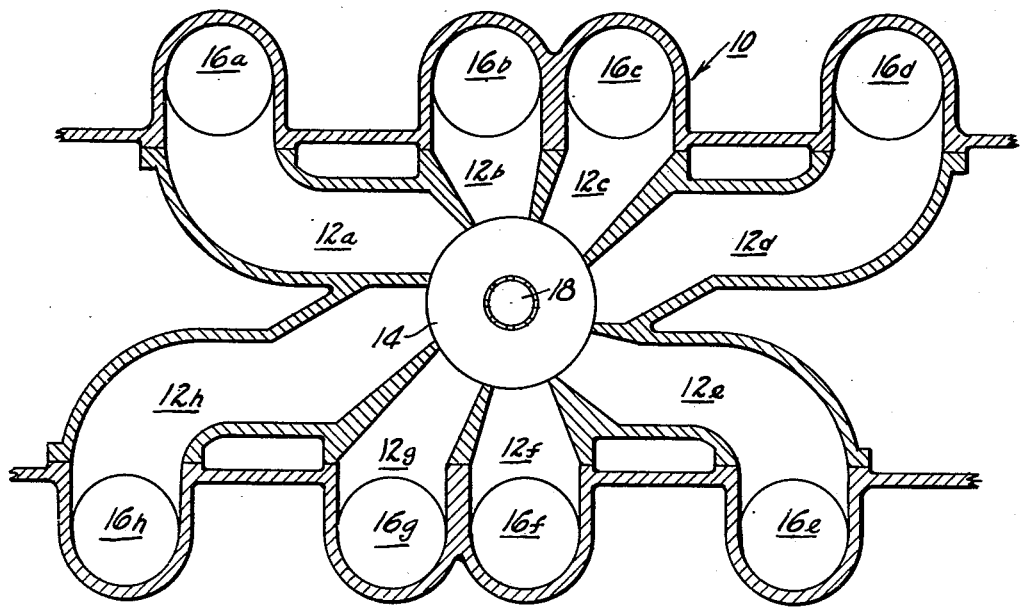
Figure 1 is a cross-sectional view of an engine manifold with a section of an injector embodying my invention mounted therein.
Figure 2:
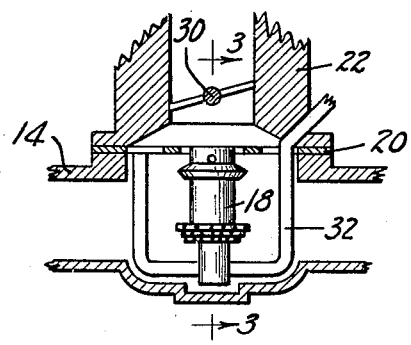
Figure 2 is a vertical cross-sectional view of a portion of Figure 1 showing one embodiment of my injector.
Figure 4:
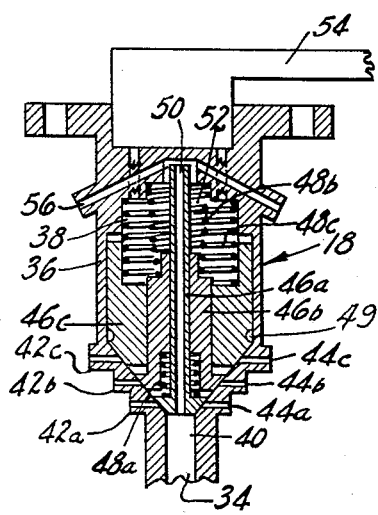
Figure 4 is a view taken along line 4—4 of Figure 3.
Figure 3:
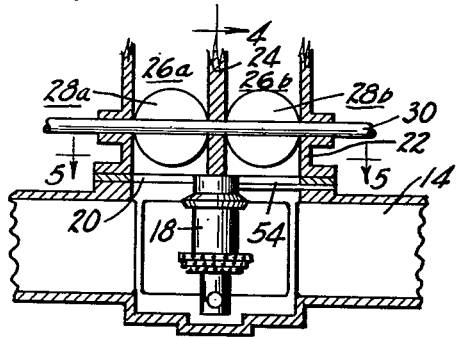
Figure 3 is a view taken along line 3—3 of Figure 2.
Figure 5:
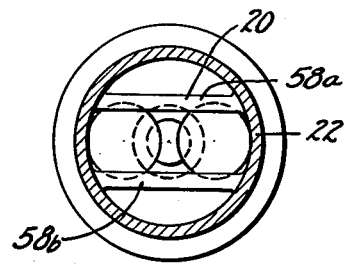
Figure 5 is a view taken along line 5—5 of Figure 3.

Referring now to the drawings there is shown in Figure 1 an intake manifold or induction passage 10 for a typical V–8 engine, not shown. Manifold 10 is provided with branches 12a, b, c, d, e, f, g and h which connect the riser or main passage 14 with intake valve ports 16a, b, c, d, e, f, g and h, respectively.

Centrally located in passage 14 is an injector 18 secured to a shroud plate 20 which is clamped between the walls of riser or main passage 14 and the walls of the main intake passage 22. The main intake passage 22 is divided by a wall 24 into two passageways 26a and 26b which are respectively controlled by throttle valve 28a and 28b mounted therein on a shaft 30. Fuel line 32 is adapted to connect inlet 34 of the nozzle with a source of metered fuel, not shown. A metering unit such as is shown in my U. S. Patent No. 2,361,227 assigned to the assignee of the present invention may be connected to line 32. In the embodiment shown in Figures 1 through 5, the injector 18 is provided with a housing 36 which defines a chamber 38 having a connection with inlet 34 through a conduit 40. The exterior of the housing is provided with a plurality of stepped portions 42a, b and c arranged in order of decreasing cross-sectional area in the direction of air flow. Each of the stepped portions contain a plurality of circumferentially spaced ports 44a, b and c, respectively which open into chamber 38. The ports are aligned in vertical planes through the stepped portions and are circumferentially spaced so as to align with the entrances of manifold branches 12 when the injector is in operative position.

Within chamber 38 there are located three valves 46a, b and c which are adapted to control ports 44a, b and c respectively. Valves 46a, b and c are urged toward closed position by respective springs 48a, b and c the spring rates of which are selected to permit successive opening of valves in response to fuel inlet pressure. Valve 46c is provided with a circumferential groove 49 which equalizes the effect of leakage flow around the valve.

Valve 46a is provided with a passage 50 which opens into an idle mixture chamber 52 where the fuel may be mixed with air from an air bleed 54 before discharge through idle ports 56. The idle ports are utilized during the low fuel deliveries when the valves 46a, b and c are in the closed position. At a predetermined inlet pressure valve 46a opens ports 44a and concurrently closes passage 50 cutting off the fuel supply to the idle ports 56.

Shroud plate 20 is located upstream of injector 18 and downstream of the throttle of valves 28a and b and is provided with baffles 58a and b located below the leading and trailing edges of the throttle valve so as to shroud the ports from high velocity air during idling which might otherwise interfere with distribution.

Figure 6:
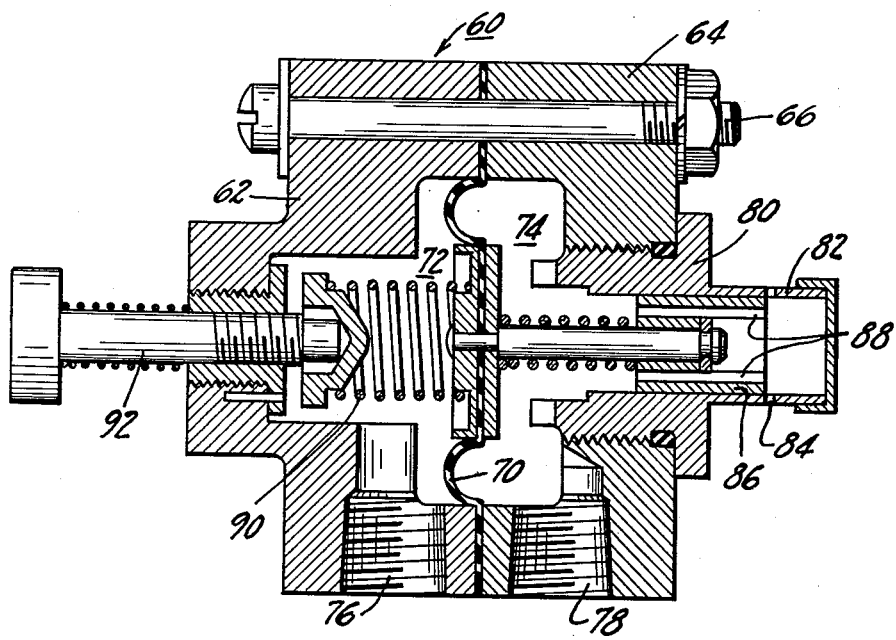
Figure 6 is a cross-sectional view of another embodiment of my injector.

In the embodiment shown in Figure 6, numeral 60 designates an injector having housing end members 62 and 64 secured together by suitable means such as bolt 66. A diaphragm 70 is marginally clamped between the end members and divides the interior of the housing into two chambers 72 and 74. Chamber 72 is adapted to be connected to the atmosphere through port 76. Chamber 74 is adapted to be connected to fuel line 32 through inlet 78. A plug 80 is threadedly received in end member 64 and contains a cylinder 82 which opens into chamber 74. Cylinder 82 is provided with a plurality of ports 84 which are circumferentially spaced so as to align with the entrances of manifold branches 12 when the injector is installed in operative position. Secured to diaphragm 70 is a piston 86 reciprocably mounted in cylinder 82 to control a fuel discharge from ports 84 in response to changes in inlet fuel pressures. A plurality of conduits 88 in piston 86 permit unrestricted flow of fuel from chamber 74 to ports 84. A spring 90 in chamber 72 urges diaphragm 70 in a direction to close ports 84. An adjustable spring retainer 92 permits the injector to be readily calibrated for a given engine installation. Nozzle 60 may be installed in an operative position in the induction passage with or without a shroud member.

It will be seen from the above description of my invention that a manifold fuel injector constructed in this manner provides equal distribution to the intake valve ports of an engine without need of plunger pumps, multiple fuel lines or multiple nozzles.

I claim:

1. An injector for an internal combustion engine induction passage comprising a housing, a plurality of stepped portions on said housing arranged in order of decreasing cross-sectional area in a direction of air flow, and a plurality of ports in each of said portions.

2. An injector for an internal combustion engine having an induction passage comprising a housing, a chamber in said housing, a conduit adapted to connect said chamber to the atmosphere, a fuel inlet to said chamber, a port adapted to connect said chamber with said passage, and means responsive to fuel inlet pressure for closing said inlet at a predetermined pressure.

3. An injector for an internal combustion engine having an induction passage comprising a housing, a chamber in said housing, an idle port in said chamber, means for supplying air to said port, a normal port in said chamber, a fuel inlet for said chamber, and a movable wall in said chamber responsive to inlet pressure adapted to connect said idle port with said inlet and to close said normal ports during one range of predetermined inlet pressures and at a pressure greater than said predetermined range of pressures to disconnect said idle port from said inlet and to connect said normal port with said inlet.

4. An injector for an internal combustion engine having an induction passage comprising a housing, a plurality of ports in said housing, a conduit adapted to connect only a portion of said ports with the atmosphere, a fuel inlet to said housing, and means responsive to fuel inlet pressure for controlling the flow through said ports.

5. An injector for an internal combustion engine having an induction passage and a throttle valve mounted on a shaft therein comprising a housing, a plurality of ports in said housing, and a baffle in said passage upstream of said ports and located downstream from the leading and trailing edges of said valve.

6. In an internal combustion engine having an induction manifold with a plurality of branches, a nozzle, a plurality of discharge ports formed in said nozzle for alignment with the entrances of said branches, and means for continuously flowing fuel through said ports during the operation of said engine.

7. An injector for an internal combustion engine having an induction manifold with a plurality of branches comprising a housing, a cylindrical chamber in said housing, a fuel inlet in said housing connected to said chamber, a plurality of discharge ports in said housing opening into said chamber and formed for alignment with the entrances of said branches, a piston in said chamber adapted to coact with said ports to regulate the flow therethrough, and an inlet fuel pressure responsive movable wall in said housing connected to said piston.

8. In an internal combustion engine having an induction passage, a plurality of engine inlet valves, and branch conduits radiating from said passage to each of said valves, a nozzle in said passage, means for supplying fuel under pressure to said nozzle, ports in said nozzle formed to discharge into the entrance of each of said conduits and fuel pressure responsive means in said nozzle for controlling the flow through said ports to provide a continuous spray of fuel into said branch conduits during the operation of said engine.

References Cited in the file of this patent

UNITED STATES PATENTS

| | | |
|---|---|---|
| 1,359,166 | Good | Nov. 16, 1920 |
| 1,629,500 | Good | May 24, 1927 |
| 2,337,996 | Hersey et al. | Dec. 28, 1943 |
| 2,606,066 | Thompson | Aug. 5, 1952 |